United States Patent
Ogawa

(10) Patent No.: US 9,513,538 B2
(45) Date of Patent: Dec. 6, 2016

(54) PROJECTOR, SUPPORT PLATE AND PROJECTION METHOD OF PROJECTOR

(71) Applicant: CASIO COMPUTER CO., LTD., Shibuya-ku, Tokyo (JP)

(72) Inventor: Kyosuke Ogawa, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 301 days.

(21) Appl. No.: 14/276,711

(22) Filed: May 13, 2014

(65) Prior Publication Data

US 2014/0354964 A1    Dec. 4, 2014

(30) Foreign Application Priority Data

May 29, 2013  (JP) .................................. 2013-112815

(51) Int. Cl.
  *G03B 21/14*  (2006.01)
  *F16M 11/00*  (2006.01)
  *F16M 11/04*  (2006.01)
  *G03B 21/28*  (2006.01)

(52) U.S. Cl.
  CPC ............ *G03B 21/145* (2013.01); *F16M 11/04* (2013.01); *G03B 21/28* (2013.01)

(58) Field of Classification Search
  CPC ........ F16M 11/00; F16M 11/04; G03B 21/145
  USPC ................................................... 353/70, 119
  See application file for complete search history.

(56) References Cited

U.S. PATENT DOCUMENTS 7,784,951 B2    8/2010  Shirakura
8,714,756 B2    5/2014  Yang
8,985,788 B2 *  3/2015  Zhu ..................... G03B 21/00
                                              248/121
9,052,580 B2    6/2015  Fujioka et al.
2006/0065809 A1* 3/2006  Chang .................. F16M 11/04
                                              248/346.05

(Continued)

FOREIGN PATENT DOCUMENTS

CN    2696009 Y    4/2005
CN    1704838 A    12/2005

(Continued)

OTHER PUBLICATIONS

Chinese Office Action (and English translation thereof) dated Jul. 29, 2015, issued in counterpart Chinese Application No. 201410228019.1.

(Continued)

*Primary Examiner* — William C Dowling
(74) *Attorney, Agent, or Firm* — Holtz, Holtz & Volek PC

(57) ABSTRACT

There is provided a projector comprising: a polyhedral main body portion made up of a plurality of surfaces which includes a projection unit; and a support plate which has substantially the same size as that of a first surface of the plurality of surfaces of the main body portion and which is detachably attached to the first surface, wherein the support plate has in a substantially central portion a fixing portion to which a second surface of the plurality of surfaces which is smaller than the first surface is fixed, and wherein when the main body portion is placed on the support plate in such a way that the second surface functions as a bottom surface, the second surface of the main body portion is fixed to the fixing portion of the support plate, whereby the main body portion is allowed to stand alone.

16 Claims, 8 Drawing Sheets

(56) References Cited

U.S. PATENT DOCUMENTS

| | | | | |
|---|---|---|---|---|
| 2006/0164612 A1* | 7/2006 | Chen | ................. | F16M 7/00 |
| | | | | 353/119 |
| 2012/0256071 A1* | 10/2012 | Dittmer | ................. | F16M 11/04 |
| | | | | 248/323 |
| 2012/0309229 A1* | 12/2012 | Yang | ................. | F16M 11/06 |
| | | | | 439/620.01 |
| 2013/0264434 A1* | 10/2013 | Unno | ................. | G03B 21/14 |
| | | | | 248/58 |
| 2013/0308251 A1* | 11/2013 | Tseng | ................. | F16M 11/16 |
| | | | | 361/679.01 |

FOREIGN PATENT DOCUMENTS

| | | |
|---|---|---|
| CN | 101009980 A | 8/2007 |
| CN | 102207671 A | 10/2011 |
| CN | 202812669 U | 3/2013 |
| CN | 103091946 A | 5/2013 |
| JP | 2005-093629 A | 4/2005 |
| JP | 2011-158522 A | 8/2011 |

OTHER PUBLICATIONS

Chinese Office Action (and English translation thereof) dated Mar. 15, 2016, issued in counterpart Chinese Application No. 201410228019.1.

\* cited by examiner

PROJECTOR, SUPPORT PLATE AND PROJECTION METHOD OF PROJECTOR

CROSS-REFERENCE TO RELATED APPLICATION

This application is based upon and claims the benefit of priority under 35 USC 119 of Japanese Patent Application No. 2013-112815 filed on May 29, 2013 the entire disclosure of which, including the description, claims, drawings and abstract, is incorporated herein by reference in its entirety.

BACKGROUND OF THE INVENTION

1. Field of the Related Art

The present invention relates to a small projector and more particularly to a projector which can be placed on a desktop to use the desktop as a screen, a support plate of the projector and a projection method thereof.

2. Description of the Related Art

Heretofore, projectors are used in presentations at exhibitions, academic meetings or business meetings, or as equipment making up a home theater. In these days, the application of projectors has been extended to a shop-window advertisement.

Compared with the use of direct-view displays, images can be displayed on a larger screen by the use of projectors, which enables more people to see the same images, and therefore, projectors are useful in this respect.

In these years, various projectors have been developed to meet various demands from the market including a demand for high-quality projected images. Additionally, various ways to install a projector have been proposed and are becoming feasible widely in accordance with installation environments or diversification of applications of a projector.

Recently, small type of projectors have been proposed and been in use which can be placed on, for example, a desk to project images on a wall, a screen or a desktop.

Then, Japanese Unexamined Patent Application No. 2011-158522 (JP-A-2011-158522) discloses a projector which includes a detection unit for detecting a set state of the projector in relation to a projection plane such as the aforesaid wall, screen or desktop and a control unit for controlling a state of image projection light according to the set state of the projector so detected, wherein the detection unit detects a set state of the projector, and the control unit controls the state such as a direction and the like of image projection light to improve the useability of the projector.

With the projector disclosed in JP-A-2011-158522 described above, however, there is a fear that a set state of the projector becomes unstable when the projector is placed vertically, thereby the projector falls down.

SUMMARY OF THE INVENTION

The invention has been made in view of the problem described above which is inherent in the related art, and an object thereof is to provide a projector which becomes as stable when it is placed vertically as when it is placed horizontally, a support plate which stabilizes a main body portion of the projector, and a projection method of the projector for projecting images on a desktop as a projection plane.

According to an aspect of the invention, there is provided a projector including: a polyhedral main body portion made up of a plurality of surfaces which includes a projection unit; and a support plate which has substantially the same size as that of a first surface of the plurality of surfaces of the main body portion and which is detachably attached to the first surface, wherein the support plate has in a substantially central portion a fixing portion to which a second surface of the plurality of surfaces which is smaller than the first surface is fixed, and wherein when the main body portion is placed on the support plate in such a way that the second surface functions as a bottom surface, the second surface of the main body portion is fixed to the fixing portion of the support plate, whereby the main body portion is allowed to stand alone.

According to an other aspect of the invention, there is provided a support plate which has substantially the same size as that of a first surface of a plurality of surfaces of a projector main body portion and which is detachably attached to the first surface, wherein the support plate has in a substantially central portion a fixing portion to which a second surface of the plurality of surfaces of the projector main body which is smaller than the first surface is fixed, and wherein when the projector main body is placed in such a way that the second surface functions as a bottom surface, the second surface can be fixed to the fixing portion to be held thereto so as to allow the projector main body to stand alone.

According to a further aspect of the invention, there is provided a projection method of a projector which comprises a polyhedral main body portion made up of a plurality of surfaces which includes a projection unit, and a support plate which has substantially the same size as that of a first surface of the plurality of surfaces of the main body portion and which is detachably attached to the first surface, the projection method of the projector comprising: a process of disengaging the support plate from the main body portion; a process of fixing a second surface of the plurality of surfaces of the main body portion which is smaller than the first surface to a fixing portion at a substantially central portion of the support plate; and a process of projecting light with the support plate being placed underneath the main body portion.

DETAILED DESCRIPTION OF THE INVENTION

Hereinafter, an embodiment of the invention will be described in detail based on the accompanying drawings. The invention will be explained by using a small projector 10 as a projector of the invention.

Figure 1:
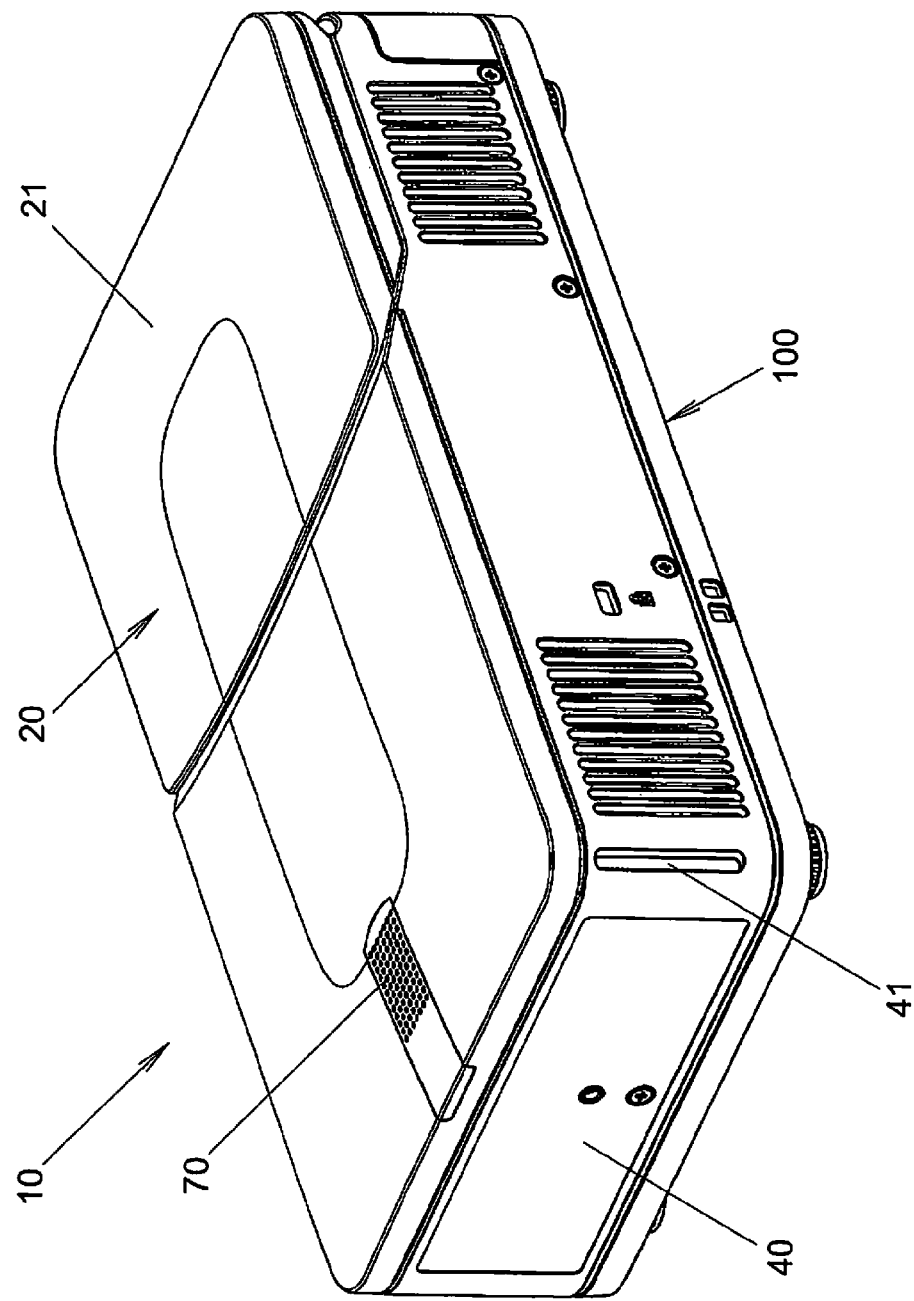
FIG. 1 is an external perspective view of a projector according to an embodiment of the invention as seen from thereabove.
Figure 2:
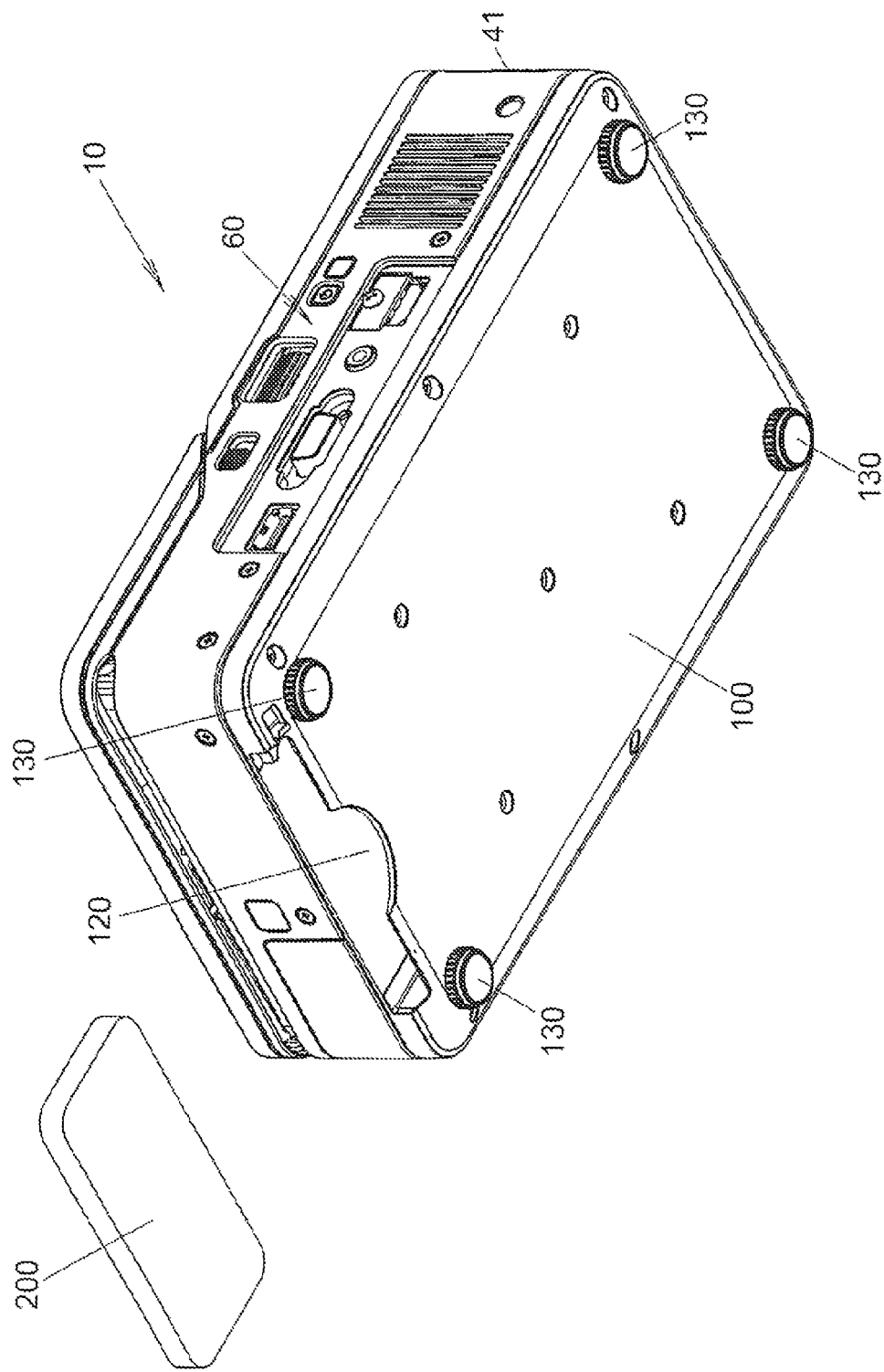
FIG. 2 is an external perspective view of the projector according to the embodiment of the invention as seen from therebelow.

FIG. 1 is an external perspective view of the projector 10 as seen from thereabove, and FIG. 2 is an external perspective view of the projector 10 as seen from therebelow.

In this embodiment, a top and a bottom of the projector 10 are defined based on a state where the projector 10 is placed. In the projector 10 shown in FIG. 1 which is placed horizontally, a surface where a light projection port lid 21 exists is referred to as top, and an opposite surface thereto is referred to as bottom. In the projector 10 which is placed vertically, an end face which lies close to the light projection port lid 21 is referred to as top, and an end face which lies far away from the light projection port lid 21 is referred to as bottom. Additionally, as to a front and rear of the projector 10, a direction in which image projection light is projected by opening the light projection port lid 21 is referred to as front, and an opposite direction thereto is referred to as rear.

The projector 10 of the invention includes a polyhedral case made up of a plurality of faces which accommodates alight source which generates image projection light, a projection optical system and the like, and image projection light can be projected by opening the light projection port lid 21 which is provided in an upper portion of the case.

Additionally, the projector 10 includes in an interior thereof a detection unit which detects whether the projector 10, which is a projector of the invention, is placed horizontally or vertically and a control unit which controls a vertical orientation of the image projection light, that is, a vertical orientation of a projected image that is formed by the image projection light according to the state of the projector 10 so detected by the detection unit.

As shown in FIG. 1, this projector 10 is a small projector 10 which is formed into a thick cube of an about A5 to A4 size and includes a main body portion 20 and a support plate 100. A group of various terminals 60 including an input/output connector port such as a picture signal inputting D-SUB terminal to which analog R, G and B picture signals are input, USB terminal and the like, a remote controller signal receiving port, a power supply adapter plug port and the like are provided in a lateral surface of the projector 10 (the main body portion 20) which is formed substantially into a rectangular parallelepiped shape, as shown in FIG. 2.

Additionally, outside air intake slits and inside air outlet slits are formed in lateral surfaces of the projector 10 to suppress the increase in temperature in the interior of the projector 10 by the light source, and cooling fans or the like are disposed in the interior of the projector 10.

Linear groove-shaped recess portions 41 are provided individually in corner portions which are situated at both ends of the lateral surface of the projector 10 which lies far away from the light projection port lid 21.

The light projection port lid 21 described above and a voice-output loud speaker 70 are provided in an upper surface of the projector 10. The light projection port lid 21 can be opened obliquely upwards, whereby a projection window is exposed. Further, a projection unit is provided in the interior of the projector 10, and this projection unit projects image projection light towards a screen, a wall or a desktop and includes a projection lens group which is made up of a plurality of lenses, an aspheric mirror and the like.

In addition, as shown in FIG. 2, the projector 10 includes the support plate 100 which can be detached from a bottom of the projector 10. The support plate 100 is a thin rectangular plate and has substantially the same area as those of top and bottom surfaces of the main body portion 20. The support plate 100 is a hard flat plate and constitutes a member which supports the main body portion 20 when it is placed horizontally or vertically thereon. Additionally, the support plate 100 includes adjustment portions which adjust the inclination of the main body portion 20 or a projection angle of the projector 10 at four corners thereof. The adjustment portions include tilt feet 130 which are individually adjustable in height and are made from an elastic material. Each tilt foot 130 has a circular and curved contact surface.

In addition, a remote controller accommodation portion 120 is provided in the support plate 100, and this remote controller accommodation portion 120 constitutes a space where a remote controller 200 can be accommodated sideways.

The remote controller accommodation portion 120 is opened in a side of the support plate 100 and is formed into a bag-like shape which accommodates substantially the whole of the remote controller 200. Additionally, the remote controller accommodation portion 120 includes a locking portion in an interior thereof, so that the remote controller 200 is fixed in an accommodated state when the remote controller 200 is inserted into the remote controller accommodation portion 120. Further, when a side portion of the remote controller 200 which slightly projects from an opening of the remote controller accommodation portion 120 is pushed in, the fixing of the remote controller 200 by the locking portion is released, whereby the remote controller 200 is slightly pushed out by means of a spring, so that the remote controller 200 can be removed from the remote controller accommodation portion 120.

FIG. 2 shows an example in which the height adjustable tilt feet 130 are disposed individually at the four corners of the support plate 100. However, two tilt feet 130 may be provided in such a way as to be provided individually at both ends of one side of the support plate 100 or three tilt feet 130 may be provided in such a way that two tile feet 130 are provided individually at both ends of one side and the remaining tilt foot 130 is provided at a middle position of another side of the support plate 100 which is opposite to the one side.

Figure 3:
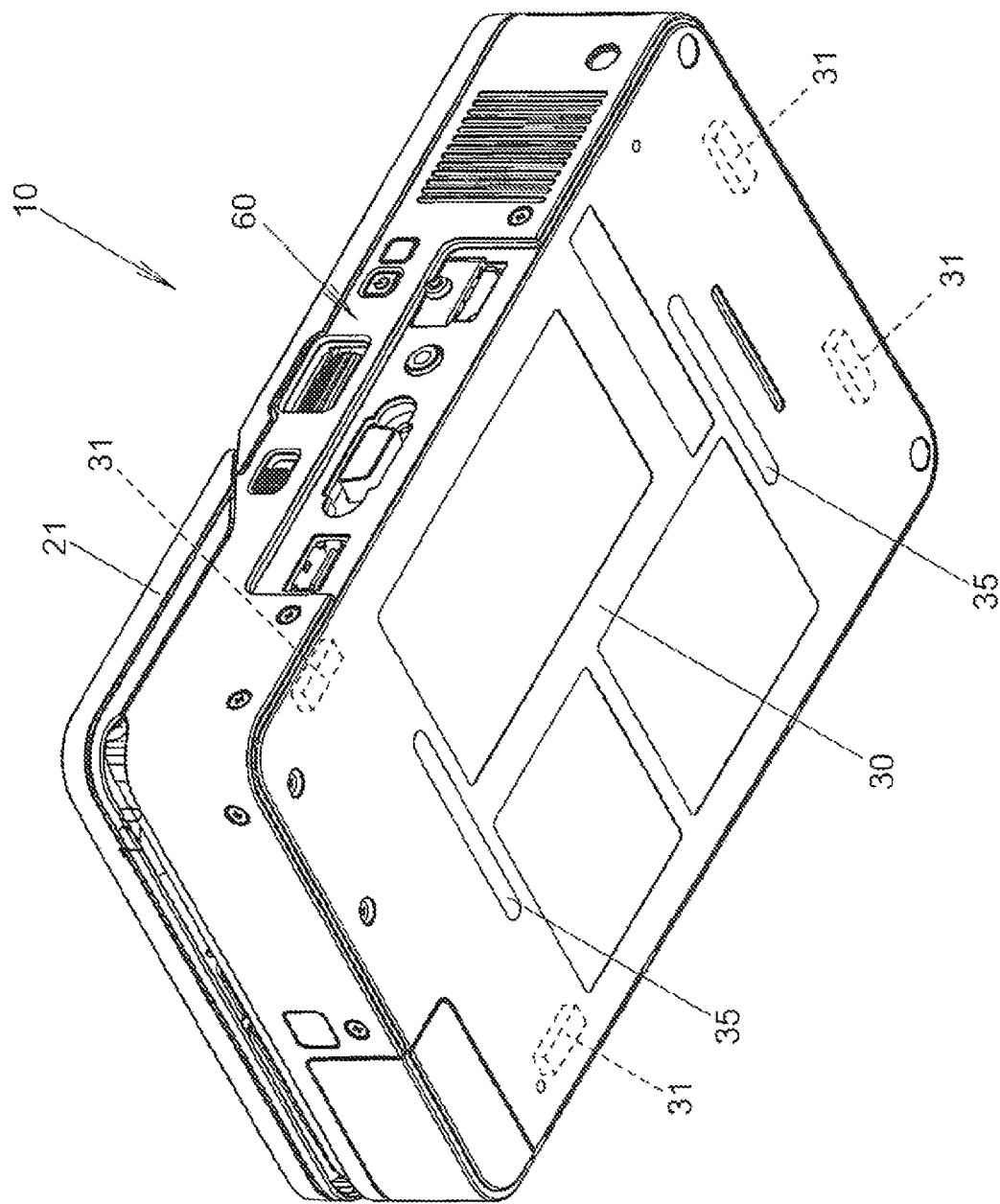
FIG. 3 is an external perspective view of a main body portion of the projector according to the embodiment of the invention as seen from therebelow.

Additionally, in order for the support plate 100 to be easily attached to and detached from the bottom surface of the main body portion 20 of the projector 10, for example, magnets 31 are provided near four corners of the bottom surface of the main body portion 20 which is opposite to the support plate 100 as shown in FIG. 3. Then, magnets 131 which magnetically attract magnets are also provided on the support plate 100 in positions which face opposite to the corresponding positions on the bottom surface 30 of the main body portion 20 where the magnets 31 are provided so as to attract magnetically the magnets 31, so that the magnets 31 on the main body portion 20 and the magnets 131 provided on the support plate 100 attract each other, whereby the main body portion 20 and the support plate 100 can be attached to each other integrally in ensured fashion.

In addition, a configuration may be adopted in which magnets are not provided on both the main body portion 20 and the support plate 100 but are provided only on either of the main body portion 20 and the support plate 100 while metallic plates which are magnetically attracted by the magnets are provided on the other.

For example, a configuration may be adopted in which metallic plates which are magnetically attracted by the magnets 131 on the support plate 100 are provided in predetermined locations on the bottom surface 30 of the main body portion 20 or a single metallic plate is provided on the whole of the bottom surface 30 of the main body portion 20. Alternatively, a configuration may be adopted in which metallic plates are disposed in predetermined locations of the support plate 100 which correspond to the magnets 31 on the main body portion 20 or a single metallic plate is provided on the whole of the support plate 100.

Projecting engagement portions 35, which each have a semi-cylindrical rod-like shape, are provided on the bottom surface 30 of the main body portion 20 of the projector 10 so as to enable the support plate 100 to be positioned properly on the bottom surface 30 in joining the support plate 100 to the bottom surface 30 of the main body portion 20. These engagement portions 35 are inserted individually into end positions of a recess which is formed as a fixing portion 110 in the support plate 100 so as to match the lateral surface 40 (which constitutes a bottom surface of the projector 10 when it is placed vertically) of the projector 10. In fixing the support plate 100 to the bottom surface 30 of the main body portion 20 when the main body portion 20 is placed horizontally, the engagement portions 35 facilitate the alignment of the main body portion 20 of the projector 10 with the support plate 100.

The attachment of the support plate 100 to the bottom surface 30 of the main body portion 20 is not limited to the approach which utilizes the magnets. Therefore, a mechanical approach may be adopted in which claw portions or irregularities are provided on the support plate 100 and the bottom surface 30 so that the support plate 100 can freely be attached to and detached from the bottom surface 30 of the main body portion 20 through a mechanical engagement.

Figure 4:
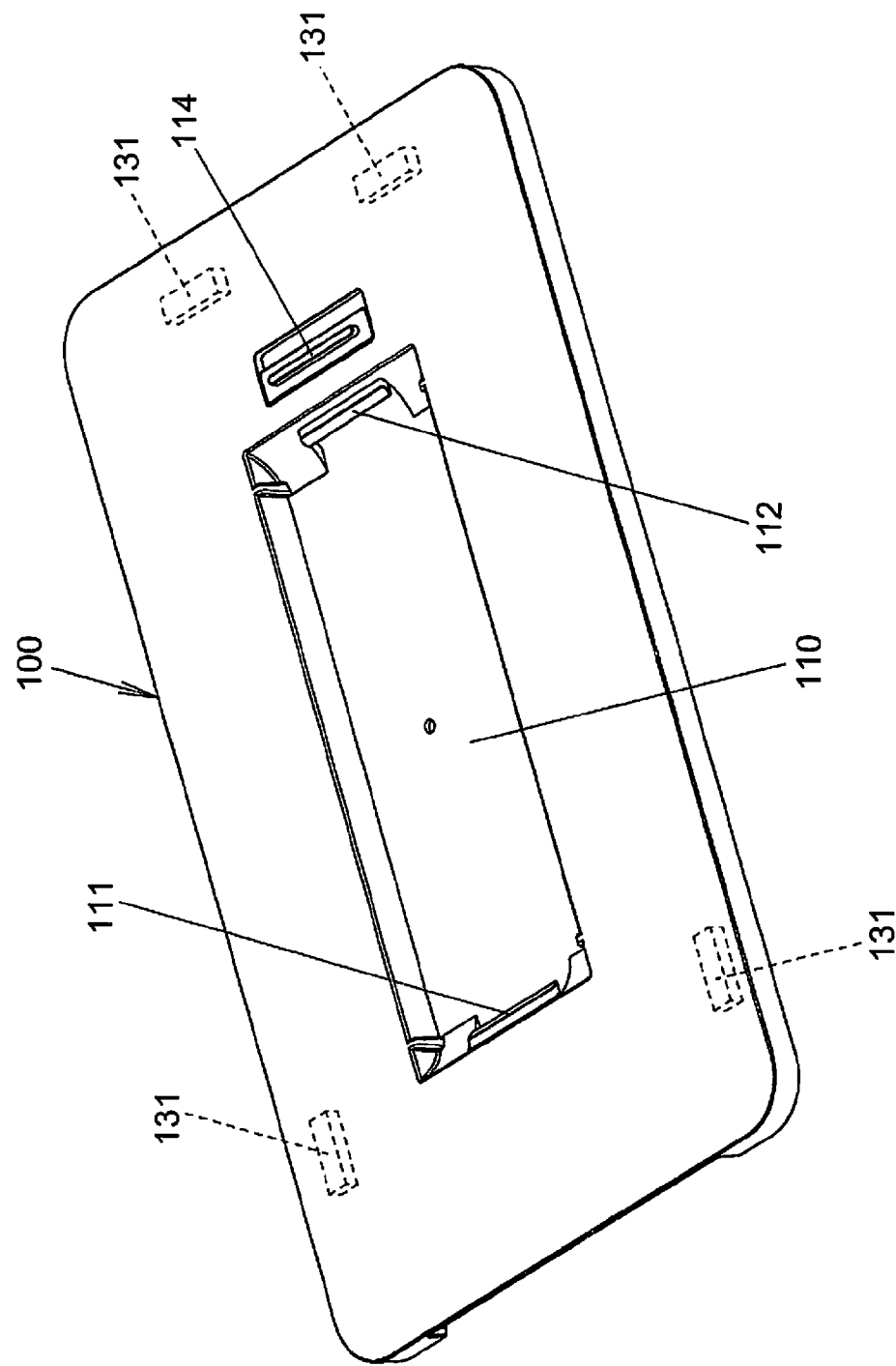
FIG. 4 is an external perspective view of a support plate of the projector according to the embodiment of the invention as seen from thereabove.

As shown in FIG. 4, the support plate 100 has the fixing portion 110 in a substantially central portion thereof. The fixing portion 110 fixes a second surface of the main body portion 20 which intersects the bottom surface 30 of the main body portion 20 when it is placed horizontally at right angles with one side of the second surface lying adjacent to one side of the bottom surface 30. This second surface corresponds to the bottom surface 40 (refer to FIG. 1) of the main body portion 20 when the main body portion 20 is placed vertically and is smaller than a first surface which is the bottom surface 30 of the main body portion 20 when the main body portion 20 is placed horizontally.

This fixing portion 110 is formed into a rectangular recess portion when viewed from thereabove and has a configuration which enables a mechanical engagement between the main body portion 20 and the support plate 100 by including an engaging projection 111 and an engagement operating portion 112 which function to fix the bottom surface 40 of the main body portion 20 when the main body portion 20 is placed vertically to both wall surfaces of shorter side portions of the fixing portion 110 at their shorter sides. When the main body portion 20 is placed in such a way that the second surface functions as the bottom surface 40 of the main body portion 20, the fixing portion 110 fixes the second surface so that the main body portion 20 can stand alone.

The engaging projection 111 is one of projections which is brought into engagement with one of the recess portions 41 which are provided individually in the corner portions which are situated at both the ends of the lateral surface of the projector 10, that is, the recess portions 41 which are formed individually in the corner portions which are situated at chamfered shorter side portions of the bottom surface 40 of the main body portion 20 when the main body portion 20 is placed vertically to thereby hold the vertically placed main body portion 20 while allowing the main body portion 20 so placed to stand alone in the fixing portion 110 of the support plate 100.

The engagement operating portion 112 is the other of the projections which holds the vertically placed main body portion 20 while allowing the main body portion 20 so placed to stand alone in the fixing portion 110 of the support plate 100.

Additionally, the engagement operating portion 112 can be operated by controlling a sliding operation lever 114, and a distal end of the engagement operating portion 112 is caused to project into a recess portion in the fixing portion 110 by an elastic member. The distal end of the engagement operating portion 112 is brought into engagement with the other of the recess portions 41 which are formed individually in the corner portions which are situated at the chamfered shorter side portions of the bottom surface 40 of the main body portion 20 when the main body portion 20 is placed vertically.

Consequently, by making use of the fixing portion 110 which includes the engaging projection 111 and the engagement operating portion 112, the user positions one of the shorter side portions (the corners) of the bottom surface 40 of the main body portion 20 at one of the shorter sides of the fixing portion 110 so that the engaging projection 111 is fitted in the one of the recess portions 41 which are formed individually in the corner portions at the ends of the lateral surface of the main body portion 20 of the projector 10. Then, the user forces the main body portion 20 into the fixing portion 110 so that the second surface, which is the lateral surface constituting the bottom surface 40 of the main body portion 20 when the main body portion 20 is placed vertically, is inserted into the fixing portion 110. Then, the corner having the other recess portion 41 which is situated at one of the shorter side portions of the lateral surface of the main body portion 20 pushes in the engagement operating portion 112 temporarily at a chamfered round portion thereof, and thereafter, the engagement operating portion 112 is brought into engagement with the other recess portion 41. Thus, the user can fix the main body portion 20 to the support plate 100 while allowing the main body portion 20 to stand alone on the support plate 100.

When removing the main body portion 20 from the support plate 100, the user first operates the operation lever 114 to pull in the distal end of the engagement operating portion 112 into an interior of the support plate 100 from the recess portion which is the fixing portion so as to disengage the engagement operating portion 112 from the recess portion 41. Then, the recess portion 41 is disengaged from the engagement operating portion 112, whereupon the user inclines the main body portion 20 so as to raise the corners of the main body portion 20 which lie on the side where the recess portion 41 is disengaged from the engagement operating portion 112, whereafter the user raises the main body portion 20 in such a way as to disengage the other recess portion 41 from the engaging projection 111. In this way, the user can easily remove the main body portion 20 from the support plate 100.

In fixing the main body portion 20 which is placed vertically to the fixing portion 110, the invention is not limited to the fixing portion 110 which has the configuration in which the main body portion 20 is brought into mechanical engagement with both the wall surfaces of the shorter side portions of the rectangular recess portion of the fixing portion 110. For example, the fixing portion 110 may have a configuration in which a magnet is provided in the recess portion which is formed as the recess which accommodates the second surface of the main body portion 20 as shown in FIG. 4 and a metallic plate or a magnet which is magnetically attracted by the magnet is disposed in a predetermined location of the bottom surface 40 of the main body portion 20 when it is placed vertically. Thus, once the bottom surface 40 of the main body portion 20 which is placed vertically is inserted into the recess portion, the lateral surface, which is the bottom surface 40, of the main body portion 20 is prevented from being disengaged abruptly from the recess portion.

Figure 5:
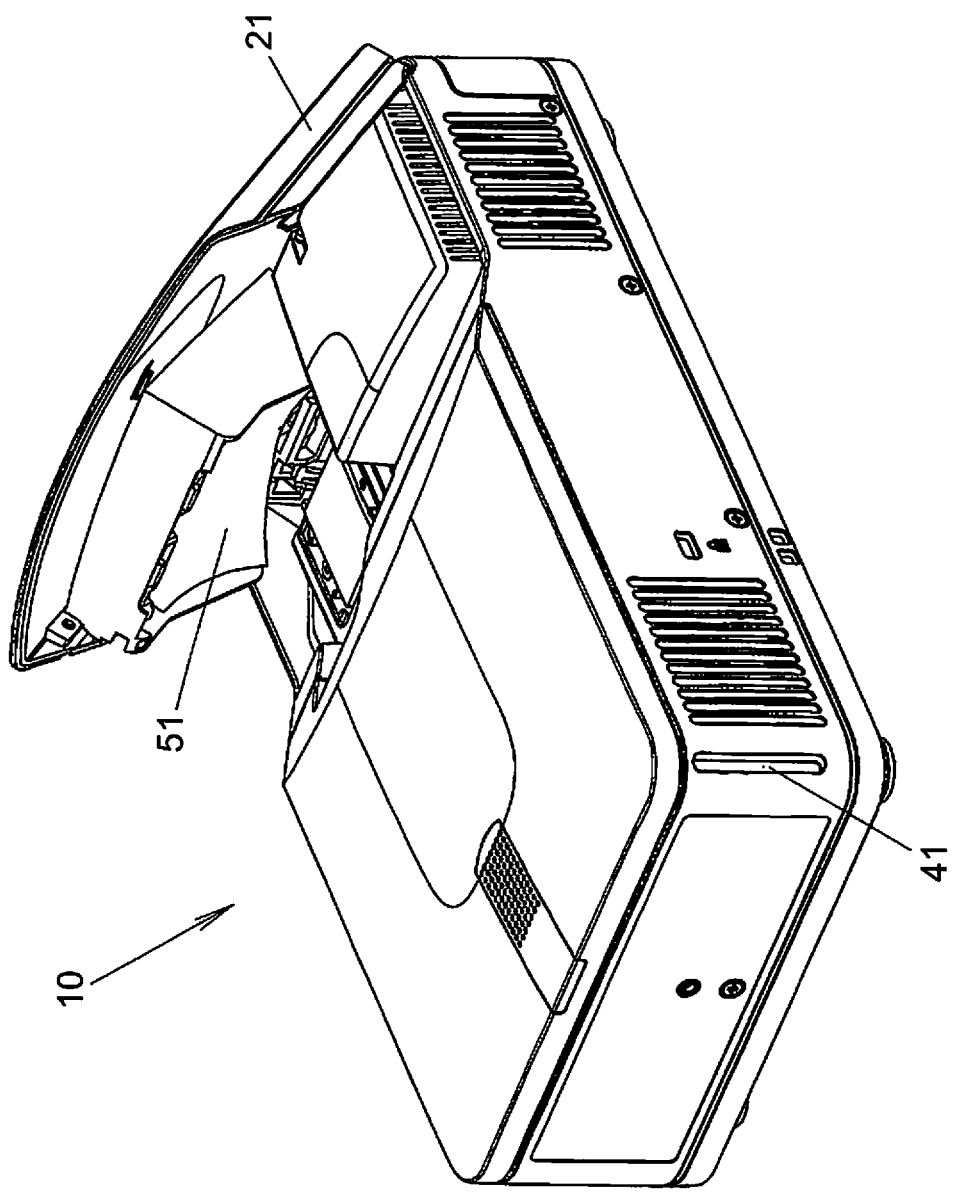
FIG. 5 is an external perspective view of the projector according to the embodiment of the invention when a light projection port lid is opened.

Then, with the projector 10 placed horizontally, by opening the light projection port lid 21 as shown in FIG. 5, image projection light can be projected on to a wall or a screen.

The projector 10 includes, as main constituent members, the projection unit which includes the projection lens group and the aspheric mirror 51, a DMD (Digital Micromirror Device) as a display device, an illumination unit which shines light to the DMD and a power supply unit which includes a battery or the like which supplies electric power to an LED which makes up the illumination unit.

The projection unit includes the optical system which is made up of the projection lens group made up of the plurality of lenses which are disposed inside the light projection port lid and the concave aspheric mirror 51, and a projection window which emits image projection light.

The projection lens group emits image projection light which is modulated at the DMD in the direction of the aspheric mirror 51, and the aspheric mirror 51 reflects the image projection light from the projection lens group to shine the light outwards via the projection window. Then, the aspheric mirror 51 is the concave mirror which projects the image projection light towards the screen or the wall surface in an enlarged fashion.

Figure 6:
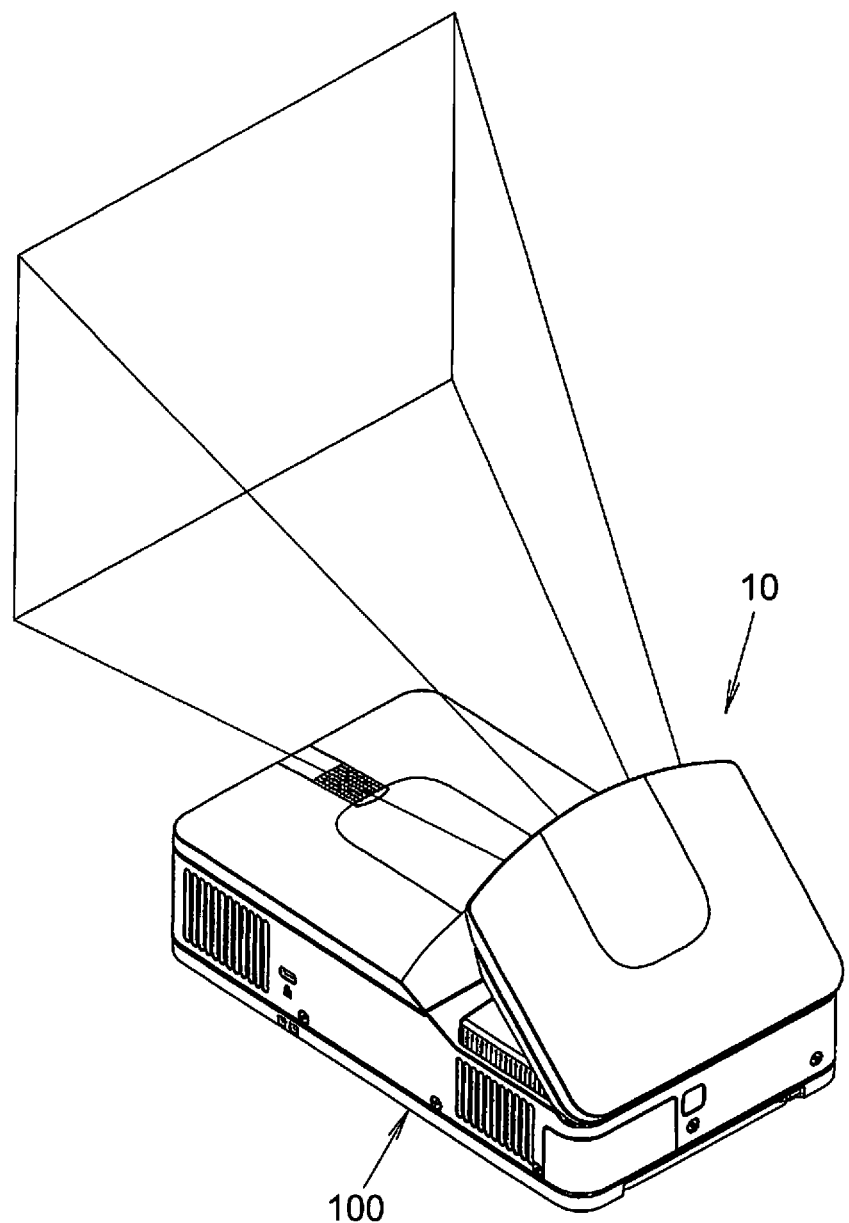
FIG. 6 is an explanatory drawing which explains a projection on a wall by the projector according to the embodiment of the invention.

Namely, as shown in FIG. 6, when the projector 10 is placed horizontally on a tabletop or a desktop, the projector 10 can project images on a wall surface or a screen which is placed near the projector 10 while magnifying the images up to a maximum of the order of 60 inches diagonal, for example.

In this projector 10, blue, green and red light from respective light sources which is shone in a time-sharing fashion is modulated according to picture input signals by the DMD. In addition, the projector 10 includes in the interior thereof the detection unit which detects whether the projector 10, which is the projector of the invention, is placed horizontally or vertically and the control unit which controls a vertical orientation of image projection light, that is, a vertical orientation of a projected image that is formed by the image projection light according to the state of the projector 10 so detected by the detection unit. The control unit also executes a keystone correction of the projected image and suppresses distortion of the projected image.

Figure 7:
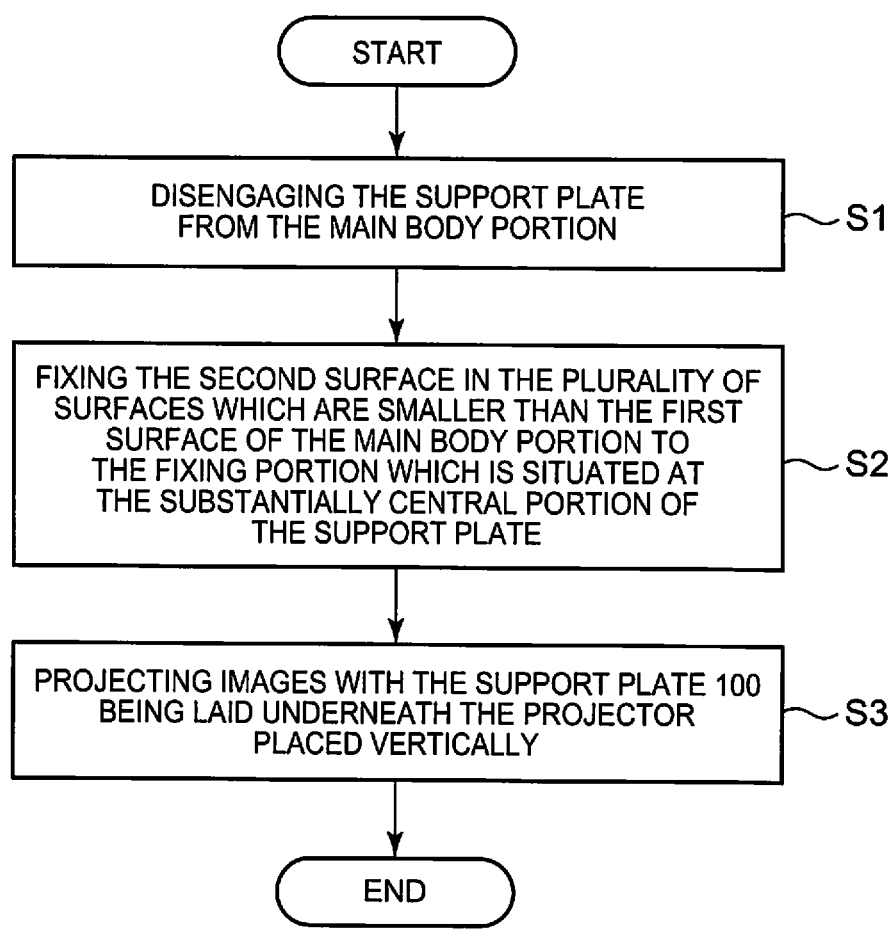
FIG. 7 is a flowchart which explains a flow of a projection method of the projector according to the embodiment of the invention.

FIG. 7 is a flowchart which explains a flow of projection method according to the embodiment of the invention.

In projecting images by the projector according to the embodiment of the invention, firstly, a step of disengaging the support plate 100 from the main body portion 20 (step S1) is executed. Next, a step of fixing the second surface (40) in the plurality of surfaces which are smaller than the first surface (30) of the main body portion 20 to the fixing portion 110 which is situated at the substantially central portion of the support plate 100 (step S2) is executed.

Finally, a step of projecting images (step S3) is executed with the support plate 100 being laid underneath the projector placed vertically.

Figure 8:
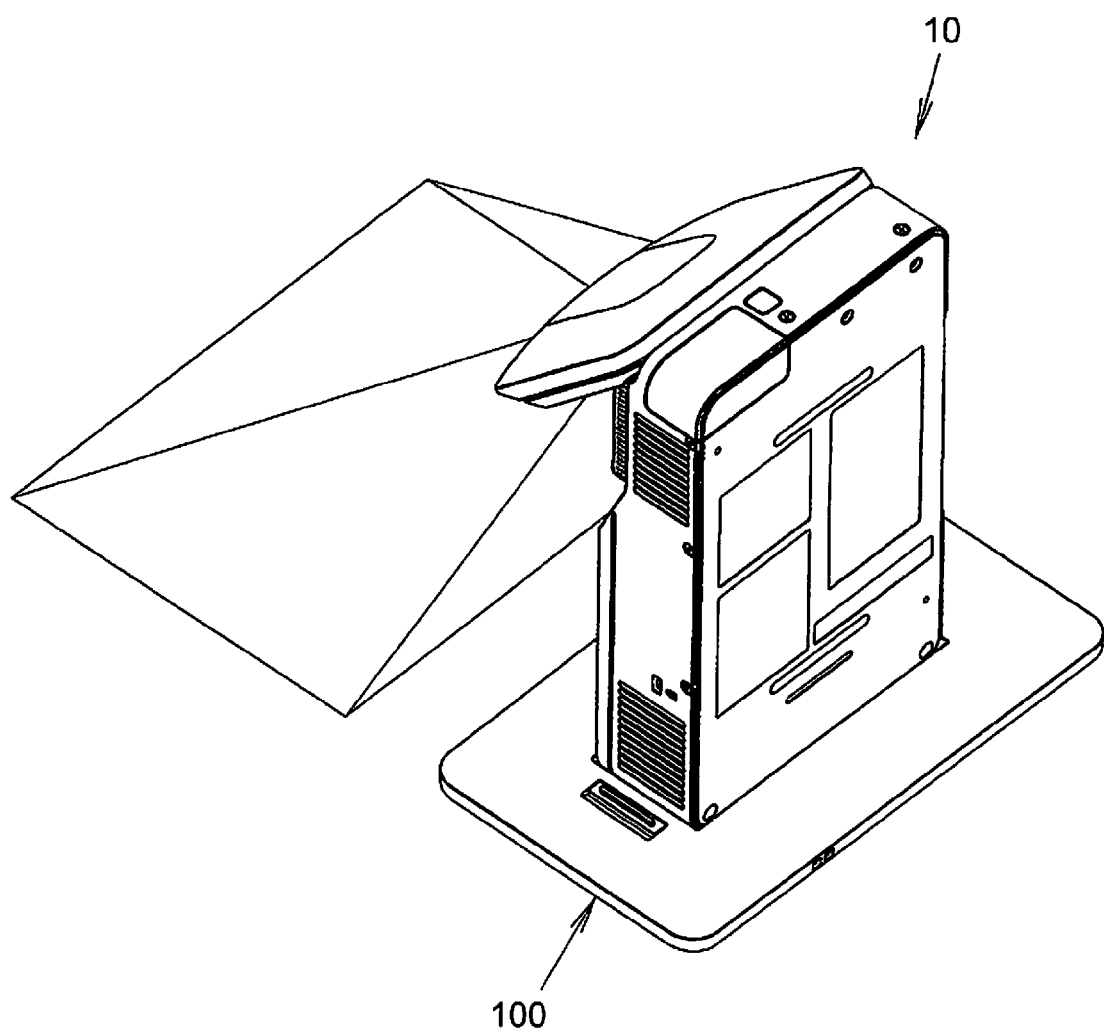
FIG. 8 is an explanatory drawing which explains a projection on a desktop by the projector according to the embodiment of the invention.

In this way, as shown in FIG. 8, the projector 10 is placed vertically so as to stand alone on the support plate 100 by fixing the lateral surface, which is the second surface, thereof to the support plate 100. As this occurs, the projector 10 can project, for example, images of the order of 20 inches diagonal (corresponding to WXGA) on to the tabletop or the desktop where the projector 10 is placed, whereby materials or the like for use in a meeting can be displayed on the tabletop or the desktop.

By adopting this configuration, the projector 10 can be placed horizontally or vertically to project properly oriented image projection light towards the wall, the screen or the desktop which forms images thereon for easy view by the user or the like, by obliquely opening the light projection port lid 21.

The projection method of the projector 10 which is placed vertically includes and realizes the step of disengaging the support plate 100 from the main body portion 20, the step of fixing the second surface in the plurality of lateral surfaces which are smaller than the first surface of the main body portion 20 to the fixing portion 110 which lies at the substantially central portion of the support plate 100 and the step of projecting images with the support plate 100 being laid underneath the projector 10 which is placed vertically.

Thus, according to this embodiment, it is possible to provide the projector which is as stable when it is placed vertically as when it is placed horizontally, the support plate which stabilizes the main body portion and the projection method of projecting images onto the desktop by the projector which is placed vertically.

It is noted that in this specification, while the projector 10 is described as projecting images on to the desktop or the like where it is placed vertically, the projector 10 may project images on to the wall or the screen depending upon the specifications of an optical system used.

In addition, the projector 10 is allowed to stand alone stably not only when the projector 10 is placed horizontally but also when it is placed vertically. Additionally, the main body portion 20 and the support plate 100 can be accommodated together in such a state that the projector 10 can be placed horizontally, thereby making it possible not only to prevent the loss of the support plate 100 but also to make the whole of the projector 10 small in size.

Further, according to the embodiment, by providing the tilt feet 130 on the support plate 100 as the adjustment portions, in adjusting finely the projection angles depending upon whether the projector 10 is placed horizontally or vertically, the adjustment can be facilitated.

In addition, according to the embodiment, the area of the first surface of the main body portion 20 is equal to the area of the support plate 100, and therefore, when the support plate 100 is attached to the first surface, the external appearance of the projector 10 as a whole looks good, and the holding and removal of the support plate 100 to and from the main body portion 20 can be facilitated by making use of the detachable attachment approach utilizing the magnets.

The first and second surfaces, the surfaces of the support plate 100 and the main body portion 20 where they are joined to each other and the bottom surface of the recess which constitutes the fixing portion 110 may be slightly curved or have irregularities. Alternatively, in the event that the bottom surface 30, which is the first surface, and the bottom surface 40, which is the second surface, of the main body portion 20 when it is placed vertically are substantially flat, the fixing portion 110 does not have to be formed into the recess portion where the support plate 100 is depressed into the recess. Thus, the fixing portion 110 may be formed simply into a flat surface which is level with the other portion of the support plate 100, and the flat surface is caused to constitute a joint surface with the main body portion 20. Then, mechanical connecting portions such as engagement grooves or magnets may be provided in this flat surface so as to form a fixing portion 110 in the area of the flat surface which is situated in the center of the flat surface.

In addition, according to the embodiment, the magnets are provided in both the first surface of the main body portion 20 and the surface of the support plate 100 which lie opposite to each other, whereby when the main body portion 20 and the support plate 100 are joined together, the joining positions of the main body portion 20 and the support plate 100 can be determined by the magnets which magnetically attract each other, and the reliability in maintaining the joined state can be enhanced by the magnets.

Further, according to the embodiment, when the main body portion 20 is placed vertically, the support plate 100 and the second surface of the main body portion 20 are brought into mechanical engagement with each other, whereby the main body portion 20 can be fixed to the support plate 100 in an ensured fashion.

Additionally, in the event that the support plate 100 and the second surface of the main body portion 20 are connected together by means of a magnetic force when the main body portion 20 is placed vertically, the user can easily detach and attach the support plate 100 from and to the main body portion 20 when the projector 10 is attempted to be placed vertically for use when the projector 10 is carried by the user or is in use while being placed horizontally.

Further, in the event that magnets are provided in both the support plate 100 and the second surface of the main body portion 20 so that the support plate 100 and the second surface are connected together, the holding force acting between them can be enhanced.

According to the embodiment, when the projector 10 is placed horizontally for use or the projector 10 is accommodated for storage after use, the support plate 100 can be kept fixed to the first surface of the main body portion 20 in an ensured fashion, and therefore, the external appearance of the projector 10 looks smart in terms of visual design, and the support plate 100 can easily be fixed to the main body portion 20, thereby making it possible to prevent the loss of the support plate 100.

In addition, according to the embodiment, not only can the support plate 100 be connected to the main body portion 20, but also the remote controller which remote controls the main body portion 20 can be accommodated into the main body portion 100 for carriage, thereby making it possible to make the whole of the projector 10 tidy after use of the main body portion 20.

Further, the support plate 100 of this embodiment is used as the support plate 100 which stabilizes the main body portion 20 when it is placed vertically. In addition, when the main body portion 20 is carried or accommodated, the support plate 100 can be stored together with the main body portion 20 of the projector 10.

According to the embodiment, the support plate 100 has the adjustment portions at least near the ends of the one side of the support plate 100 to adjust the horizontalness of the projector 10, and therefore, the support plate 100 can be used to adjust the projection angle both when the main body portion 20 is placed horizontally and vertically.

In addition, according to the embodiment, the support plate 100 has foot portions which include height adjusting screws as the adjustment portions, and therefore, the horizontalness or the projection angle of the projector 10 can be adjusted finely while looking at a projected image.

Further, according to the embodiment, the adjustment portions are provided near the four corners of the support plate 100, and therefore, the horizontalness or the projection angle of the projector can easily be adjusted.

According to the embodiment, the support plate 100 has the remote controller accommodating portion, and therefore, it is possible to prevent the loss of the remote controller which is one of accessories.

According to the embodiment, the remote controller accommodating portion is formed into the bag-like shape which can accommodate almost the whole of the remote controller, and therefore, it is possible to prevent the inadvertent pushing of controller buttons.

According to the embodiment, when the main body portion 20 is placed vertically, the support plate 100 which is accommodated when the main body portion 20 is place horizontally is disengaged from the main body portion 20 so that the main body portion 20 is fitted in the recess in the central portion of the support plate 100 to be stabilized therein, whereby it is possible to provide safely the projection method of the projector which uses the desktop as the screen.

While the embodiment and possible modifications have been described heretofore, they have been presented as the examples of the invention, and there is no intention to limit the scope of the invention by them. These novel embodiment and its modified examples can be carried out in other various forms, and hence, various omissions, replacements and modifications can be made without departing from the spirit and scope of the invention. These embodiments and modifications are included in the spirit and scope of the invention and also in the scope of inventions claimed and their equivalents.

What is claimed is:

1. A projector comprising:
    a polyhedral main body portion which is made up of a plurality of surfaces and which includes a projection unit; and
    a support plate which has substantially a same size as that of a first surface of the plurality of surfaces of the main body portion and which is detachably attached to the first surface,
    wherein:
    the support plate has a first fixing portion to which the first surface is fixable by magnetic force,
    the support plate has, in a substantially central portion thereof, a second fixing portion to which a second surface of the plurality of surfaces which is smaller than the first surface is fixable,
    the second surface is fixable to the second fixing portion by a fixing method different from a fixing method by which the first surface is fixable to the first fixing portion, and
    when the main body portion is placed on the support plate in such a way that the second surface functions as a bottom surface, the second surface of the main body portion is fixed to the second fixing portion of the support plate, whereby the main body portion is allowed to stand alone.

2. The projector according to claim 1, wherein the support plate has an adjustment portion configured to adjust an inclination of the main body portion.

3. The projector according to claim 1, wherein both first fixing portion of the support plate and the first surface of the main body portion have magnets which magnetically attract each other.

4. The projector according to claim 1, wherein the support plate is detachably held to the first surface of the main body portion through mechanical engagement.

5. The projector according to claim 1, wherein the second fixing portion of the support plate fixes the second surface of the main body portion through mechanical engagement.

6. The projector according to claim 1, wherein the second fixing portion of the support plate fixes the second surface of the main body portion by means of a magnetic force.

7. The projector according to claim 6, wherein both the second fixing portion of the support plate and the second surface have magnets which magnetically attract each other.

8. The projector according to claim 1, wherein when the main body portion is placed in such a way that the first surface functions as a bottom surface, the support plate is placed while being attached to the main body portion.

9. The projector according to claim 1, wherein the support plate has an accommodating portion which accommodates a remote controller which remote controls the main body portion.

10. A support plate using for a projector comprising:
a support plate main body;
a first fixing portion; and
a second fixing portion;
wherein:
the support plate main body has substantially a same size as that of a first surface of a plurality of surfaces of a projector main body portion of the projector and is detachably attached to the first surface,
the first fixing portion is provided on the support plate main body, and the first surface is fixable to the first fixing portion by magnetic force,
the second fixing portion is provided in a substantially central portion of the support plate main body, and a second surface of the plurality of surfaces of the projector main body which is smaller than the first surface is fixable to the second fixing portion,
the second surface is fixable to the second fixing portion by a fixing method different from a fixing method by which the first surface is fixable to the first fixing portion, and
when the projector main body is placed in such a way that the second surface functions as a bottom surface, the second surface is fixed to the second fixing portion to be held thereto so as to allow the projector main body to stand alone.

11. The support plate according to claim 10, wherein the support plate main body is a substantially rectangular plate and has adjustment portions which are disposed individually at least near both ends of one side of the support plate main body to adjust the horizontalness of the support plate main body.

12. The support plate according to claim 11, wherein the support plate main body has foot portions which include height adjusting screws as the adjustment portions.

13. The support plate according to claim 11, wherein the adjustment portions are provided individually at four corners of the support plate.

14. The support plate according to claim 10, further comprising:
an accommodating portion which accommodates therein a remote controller which remote controls the projector.

15. The support plate according to claim 14, wherein the accommodating portion is formed into a bag-like shape which can accommodate almost a whole of the remote controller.

16. A projection method of a projector which comprises a polyhedral main body portion made up of a plurality of surfaces which includes a projection unit, and a support plate which has substantially a same size as that of a first surface of the plurality of surfaces of the main body portion and which is detachably attached to the first surface, wherein (i) the support plate has a first fixing portion to which the first surface is fixable by magnetic force, (ii) the support plate has, in a substantially central portion thereof, a second fixing portion to which a second surface of the plurality of surfaces which is smaller than the first surface is fixable, and (iii) the second surface is fixable to the second fixing portion by a fixing method different from a fixing method by which the first surface is fixable to the first fixing portion, wherein the projection method of the projector comprises:
in a case in which the first fixing portion of the support plate is fixed to the first surface of the main body portion, disengaging the first fixing portion of the support plate from the first surface of the main body portion;
fixing the second surface of the main body portion to the second fixing portion; and
projecting light with the support plate being placed underneath the main body portion.

\* \* \* \* \*